Figure 4:
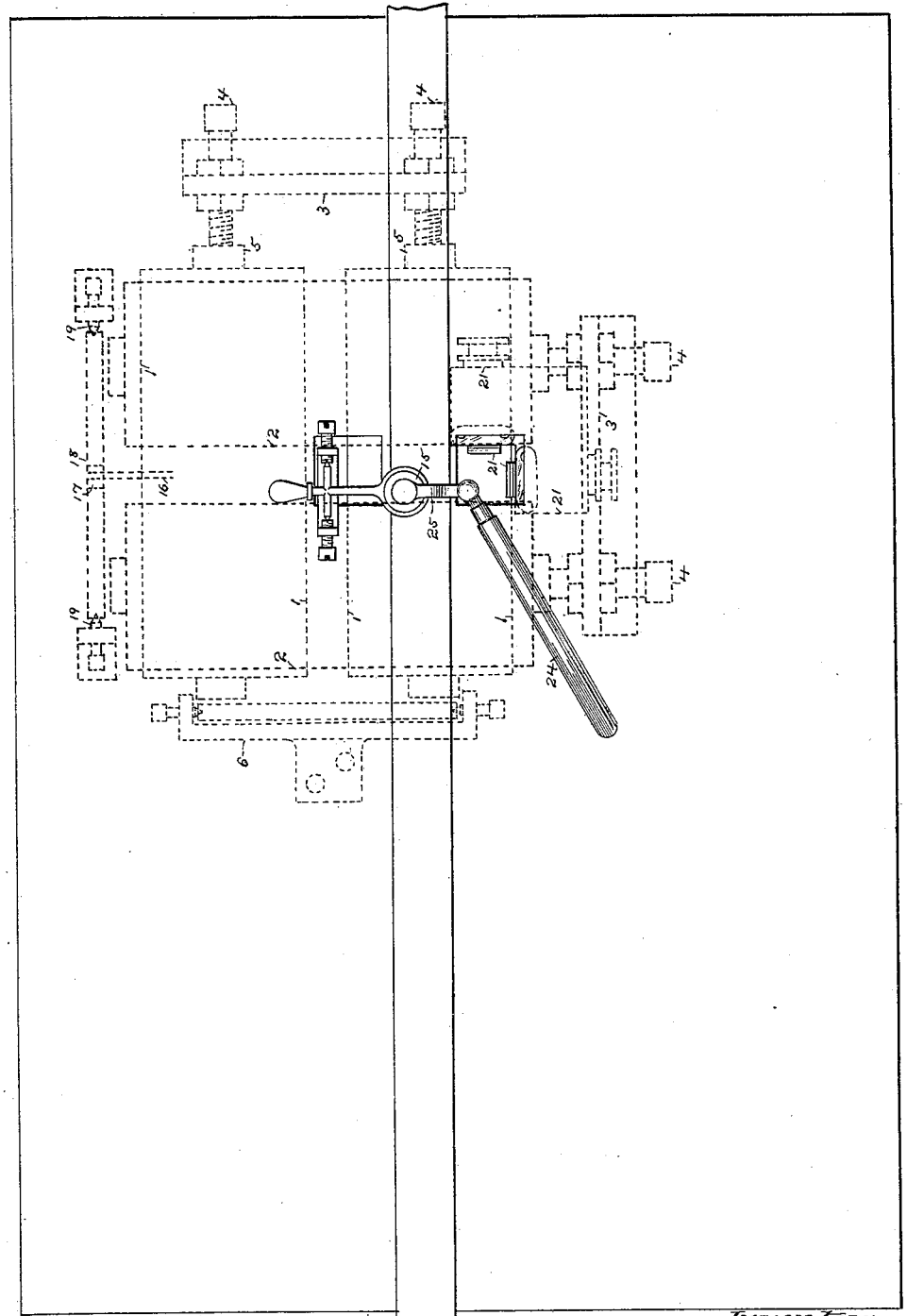

(No Model.)  2 Sheets—Sheet 1.
J. H. ROBERTSON.
AUTOGRAPHIC TELEGRAPH.
No. 353,594.  Patented Nov. 30, 1886.
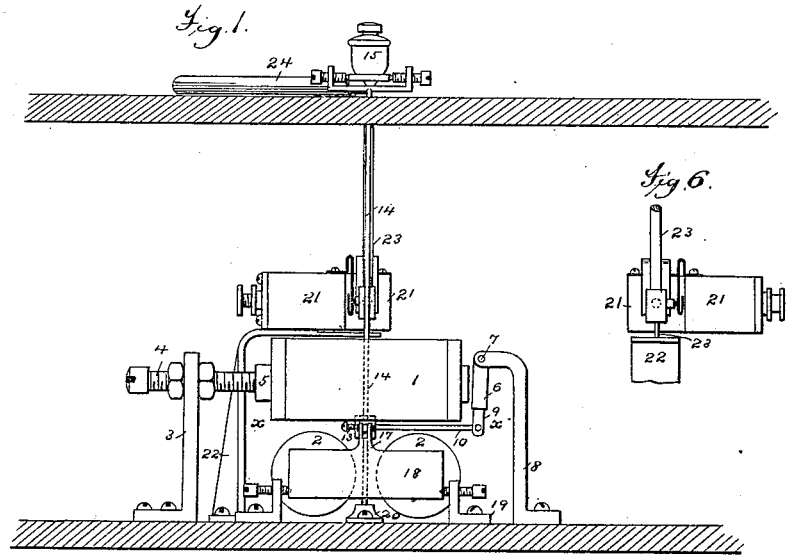
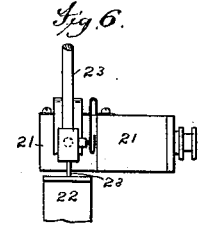
Fig. 1.  Fig. 6.
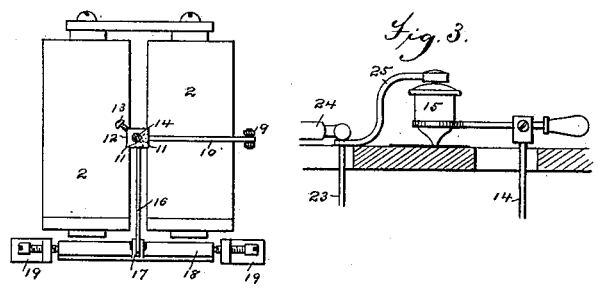
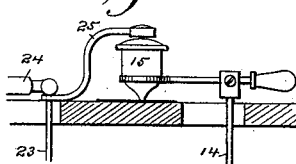
Fig. 2.  Fig. 3.
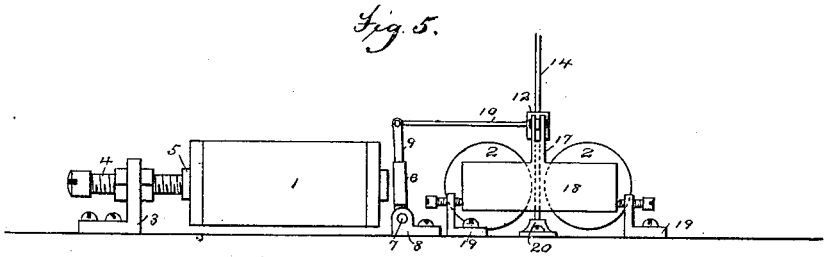
Fig. 5.
Attest:
Geo. H. Botts.
C. J. Kennedy.
Inventor:
James H. Robertson
per Behrens & Cady
Attys.

(No Model.)  2 Sheets—Sheet 2.

J. H. ROBERTSON.
AUTOGRAPHIC TELEGRAPH.

No. 353,594.  Patented Nov. 30, 1886.

Attest:
Geo H Botts
C J Kennedy

Inventor:
James H. Robertson
per Behrens & Cady

UNITED STATES PATENT OFFICE.

JAMES H. ROBERTSON, OF RUTHERFORD, NEW JERSEY.

AUTOGRAPHIC TELEGRAPH.

SPECIFICATION forming part of Letters Patent No. 353,594, dated November 30, 1886.

Application filed July 31, 1886. Serial No. 209,665. (No model.)

*To all whom it may concern:*

Be it known that I, JAMES H. ROBERTSON, a citizen of the United States, and a resident of Rutherford, New Jersey, have invented a new and useful Improvement in Autographic Telegraphs, of which the following is a specification.

My invention relates to that class of autographic telegraphs for which I have heretofore filed several applications for Letters Patent, among which may be cited applications Serial Nos. 177,435, 200,412, and 206,692.

The objects of my invention are, first, to utilize as fully as may be possible the power of the electro-magnets of the receiver; second, to dispense with adjusting-springs, and, third, to so combine and arrange the transmitter and receiver as to assist the operator in the operation of writing and transmitting. These objects I accomplish by the several combinations of parts hereinafter described and claimed.

In the accompanying drawings, forming part of this specification, Figure 1 represents an elevation of a receiving and transmitting apparatus embodying my invention. Fig. 2 is a cross-section on line $x$ $x$ of Fig. 1. Fig. 3 represents a side elevation of the receiving-pen and transmitting stylus or holder. Fig. 4 is a plan view of the apparatus embodying my invention. Fig. 5 represents a modified construction, and Fig. 6 is a detail view of a part of Fig. 1.

Referring to the drawings, 1 and 2 represent the electro-magnets of the receiver, of which magnet 1 is shown as supported from standard 3 by adjustable set-screws 4, connected with the cores 5 of said magnet. These cores, of course, may be made longitudinally adjustable with reference to their coils. Electro-magnet 2 is supported (not shown) in the same manner as magnet 1. The armature of electro-magnet 1 is pivoted at 7 to a standard, 8, and is arranged very near to said magnet, as shown, so as to utilize as much of the power of the magnet as possible. To the lower part of said armature, or to a projection, 9, thereof, a rigid bar, 10, is pivoted, which latter is universally pivoted to or connected by a ball-joint, 11, with a block, 12, secured by set-screw 13 to the vertical rod or carrier 14, holding the receiving pen or stylus 15. This rod is arranged to pass between the legs of said magnets, as shown in Fig. 2. To the said block 12 is also connected by a ball joint, 11, another rigid bar, 16, pivoted to the projection 17 of armature 18, which latter is pivoted in a standard or standards, 19, in front of electro-magnet 2. The rod or carrier 14 is stepped in the base or block 20, and consists in its entire length, or only in its lower part, of a stiff spring, which acts to keep the two armatures 6 and 18 the normal distance away from their magnets, and thus acts in opposition to the force of said magnets, not pulling, but pushing, said armatures away from their magnets. The tension of the spring part of said rod or holder is such that the armatures are kept out of absolute contact with the cores. The rod 14 is bifurcated at its upper end, and carries a counterweighted stylus, 15, as more fully described in one of my previous applications hereinbefore referred to.

In Fig. 5 I have arranged the electro-magnet 1 and its armature by the side of instead of above electro-magnet 2, as shown in Fig. 1. This arrangement is not quite so compact, and I therefore prefer the arrangement first described. For the sake of compactness I also arrange the two piles of carbon disks 21 of the transmitter over the receiver-magnets supporting said piles on a standard, 22. In the horizontal part of this standard I also support the lower end of the vertical rod 23, which carries at its upper end the holder 24, all as fully set forth in one of my previous applications hereinbefore referred to.

In order to assist the operator in the operation of writing or outlining correctly with the stylus or holder held in the hand the letters desired to be reproduced by the receiver, I attach to the rod 23, moved by the holder or stylus of the transmitter, an arm, 25, which projects over the top of the receiving stylus or pen without touching the same. (See Fig. 3.) As the receiver responds almost instantly to the movements of the transmitting-stylus, it appears to the operator that the movements of his hand are directly instead of indirectly concerned in causing the movement of the receiving-stylus, and as also the latter is arranged near the transmitting-stylus, he can readily see, by watching the characters traced on the paper by the receiving-pen, how to modify the movements of his hand if the receiver fails to produce correctly-formed letters or characters.

I have not herein shown any arrangement of circuits, as that has been fully set forth in my said former applications; nor have I considered it necessary to show more than the apparatus at one end of the line, since that at the other is only a duplication thereof.

Having thus described my invention, what I claim, and desire to secure by United States Letters Patent, is—

1. The combination, with a rod carrying the receiving stylus or pen, of a pair of rigid bars connecting said rod with the armatures of two electro-magnets arranged substantially at right angles to each other, substantially as described.

2. The combination, with a rod made to act as a spring and carrying the receiving stylus or pen of the armatures, of two electro magnets arranged substantially at right angles to each other, and a pair of rigid bars connecting said armatures with said rod, substantially as described.

3. The combination, with two electro-magnets arranged substantially at right angles to each other, and two armatures arranged very near to the same, of a rod carrying the receiving-stylus, and two bars connecting said armatures with said rod, substantially as described.

4. The combination, with two electro-magnets arranged substantially at right angles to each other, and two armatures arranged very near to the same, of a rod carrying the receiving-stylus, a block secured to said rod, and two bars connecting said armatures with said rod, and connected by a ball-and-socket joint with said block, substantially as described.

5. The combination, with two electro-magnets arranged substantially at right angles to and vertically over each other, of two armatures for said magnets, a rod carrying the receiving-stylus arranged to pass between the legs of said magnets, and two bars connecting said rod with the two armatures, substantially as described.

6. The combination, with two electro-magnets arranged substantially at right angles to and over each other, and two armatures therefor, of a rod carrying the receiving-stylus and connected by bars with said armatures, two piles of carbon disks placed above said magnets, and a transmitting-stylus arranged near the receiving-pen, substantially as described.

7. The combination, with the receiving-stylus, of the transmitting stylus and an arm projecting from the latter and arranged in proximity to the former, substantially as described.

8. The combination of the receiving-stylus with the transmitting-stylus arranged near the same, and an arm projecting from the latter and arranged in proximity to the former, substantially as described.

In testimony whereof I have hereunto subscribed my name.

J. H. ROBERTSON.

Witnesses:
WM. H. BALL,
JNO. E. GAVIN.